(12) United States Patent
Wei et al.

(10) Patent No.: US 8,550,228 B1
(45) Date of Patent: Oct. 8, 2013

(54) DIRECTION CHANGE DEVICE FOR CONVEYANCE OF DOUGH

(71) Applicant: Anko Food Machine Co., Ltd., New Taipei (TW)

(72) Inventors: Chung-Hao Wei, New Taipei (TW); Kwok Wai Ng, New Taipei (TW)

(73) Assignee: Anko Food Machine Co., Ltd., New Taipei (TW)

( * ) Notice: Subject to any disclaimer, the term of this patent is extended or adjusted under 35 U.S.C. 154(b) by 0 days.

(21) Appl. No.: 13/781,782

(22) Filed: Mar. 1, 2013

(51) Int. Cl.
*B65G 47/24* (2006.01)

(52) U.S. Cl.
USPC ........... 198/412; 198/411; 198/413; 198/414; 198/416

(58) Field of Classification Search
USPC .......................... 198/411, 412, 413, 414, 416
See application file for complete search history.

(56) References Cited

U.S. PATENT DOCUMENTS

| | | | | |
|---|---|---|---|---|
| 3,442,410 A * | 5/1969 | Solomonson | ................. | 198/401 |
| 4,086,744 A * | 5/1978 | Seragnoli | ..................... | 53/136.4 |
| 4,457,419 A * | 7/1984 | Ogami et al. | ............. | 198/345.1 |
| 4,533,033 A * | 8/1985 | van Wegen | .................... | 198/413 |
| 4,573,863 A * | 3/1986 | Picotte | .......................... | 414/763 |
| 4,591,044 A * | 5/1986 | Ogami et al. | ............. | 198/346.3 |
| 4,769,970 A * | 9/1988 | Konno | ............................ | 53/176 |
| 4,845,824 A * | 7/1989 | Ishikawa et al. | ........... | 29/243.57 |
| 4,930,615 A * | 6/1990 | Nash | .............................. | 198/411 |
| 5,141,095 A * | 8/1992 | Kamp | ........................... | 198/409 |
| 5,458,226 A * | 10/1995 | Nakao et al. | .................. | 198/379 |
| 5,967,292 A * | 10/1999 | Corrales | ....................... | 198/411 |
| 6,082,523 A * | 7/2000 | Weeks | .......................... | 198/375 |
| 6,343,686 B1 * | 2/2002 | Whiting et al. | ............... | 198/379 |
| 6,581,757 B2 * | 6/2003 | Yokota et al. | ............. | 198/836.2 |
| 6,698,163 B2 * | 3/2004 | Greenwell et al. | ............. | 53/429 |
| 6,935,484 B2 * | 8/2005 | Davis et al. | ................... | 198/416 |
| 7,682,125 B2 * | 3/2010 | Binder et al. | ............. | 414/797.2 |
| 7,909,156 B2 * | 3/2011 | Wen | ................................ | 198/403 |
| 8,061,500 B2 * | 11/2011 | Baccini | ...................... | 198/345.1 |
| 8,382,084 B2 * | 2/2013 | Gerber et al. | ................... | 269/55 |

* cited by examiner

*Primary Examiner* — Douglas Hess
(74) *Attorney, Agent, or Firm* — Leong C. Lei

(57) ABSTRACT

A direction change device for conveyance of dough includes a material conveyance platform that includes a table that is covered by a conveyance belt. Guide slots are formed in the table and are not completely covered by the conveyance belt. A swivel unit is provided under the material conveyance platform and includes two power sources that respectively provide reciprocal rotation of a predetermined angle and upward extension and backward contraction. The power source for extension and contraction has an end to which push bars are mounted to correspond to the guide slots of the table. A press plate is arranged above the guide slots. A dough sheet, when moved through the table, can be pushed upward by the push bars of the swivel unit and clamped and held by the press plate for subsequent rotation by an angle and then further proceeding forward for a subsequent operation of stuffing.

6 Claims, 9 Drawing Sheets

DIRECTION CHANGE DEVICE FOR CONVEYANCE OF DOUGH

TECHNICAL FIELD OF THE INVENTION

The present invention generally relates to a direction change device for conveyance of dough, and more particularly to a device for efficiently rotating a polygonal dough sheet by a specific angle during the conveyance of the dough sheet in order to facilitate the subsequent operation of automatic stuffing so that the overall manufacturing process is made more efficient and the installation space is reduced.

DESCRIPTION OF THE PRIOR ART

Flour based foods are one of the worldwide staples. One of the commonly known ways of cooking flour based foods is stuffed dough, such as dumpling, which is one of the widely accepted types of foodstuff. For consistency of quality and mass production with the greatest economic benefit, automatic production has been widely adopted in manufacturing such type of foodstuffs in the modern business and industrial society. For example, dumpling machines are available in the market, which flatten dough to make dough sheet that is then cut to a desired shape to receive and house stuffing therein, followed by sealing and cutting to form a dumpling or the likes. Such machines make the operation easy and simple. The present invention aims to provide techniques for conveyance and direction change of the dough sheet in deposition of the stuffing therein.

To manufacture flour based foodstuffs by means of food preparation machines, to minimize residue of dough, the best way of shaping the dough sheet is to make a square dough sheet in order to completely use all the dough without any dough residue left. This is better than circular dough sheet in minimizing dough residue and reducing waste of food material. However, in depositing stuffing on a square dough sheet, direction of the dough sheet becomes an issue to be concerned about.

Referring to FIG. 9, which is a conventional way of changing direction of square dough sheet, where two material conveyance platforms 10a, 11a are arranged in such a way to include an angle therebetween. When a dough sheet 20a is conveyed along one material conveyance platform 10a, the dough sheet will fall onto another material conveyance platform 11 a that is set at a predetermined angle with respect to the former material conveyance platform. As such, the dough sheets 20a, 21a are changed to a direction that is angularly shifted from the original advancing direction. In this way, the dough sheets can be manufactured at an angular position that is suitable for proceeding into a subsequently stuffing mechanism.

However, the conventional designs suffer the following drawbacks.

(1) The two material conveyance platforms are arranged at different levels, with one being higher than the other, and are jointed to each other with an included angle therebetween. This arrangement makes is possible for dough sheets to get stuck or to fall incorrectly from one platform to another platform.

(2) The arrangement of the two material conveyance platforms in such a way that they are located at different levels and form an included angle therebetween occupies a great amount of space. For an installation of multiple manufacture lines, the amount of space occupied by the manufacture lines is extremely great, making the expense of installation very high.

(3) The arrangement of the two material conveyance platforms in such a way that they are located at different levels and form an included angle therebetween requires the advancing speeds of the two material conveyance platforms to be set identical to each other. However, errors always exist between the platforms and such errors will be accumulated with the lapse of time of use, eventually leading to unsmooth feeding of materials. In addition, manual monitoring is necessary and this is a waste of man power.

SUMMARY OF THE INVENTION

The primary object of the present invention is to provide a device that comprises a single set of material conveyance platform to effect direction change of a dough sheet so as to reduce the amount of space of a factory occupied by such a device and to improve the operation efficiency thereof. To achieve the object, the present invention generally comprises a material conveyance platform. The material conveyance platform comprises a table that is covered by a conveyance belt. Guide slots are formed in the table and are not completely covered by the conveyance belt. A swivel unit is provided under the material conveyance platform and comprises two power sources that respectively provide reciprocal rotation of a predetermined angle and upward extension and backward contraction. The power source for extension and contraction has an end to which push bars are mounted to correspond to the guide slots of the table. A press plate is arranged above the guide slots. When a dough sheet is being moved through the table, the dough sheet can be pushed upward by the push bars of the swivel unit and clamped and held by the press plate for subsequent rotation by an angle and then further proceeding forward for a subsequent operation of stuffing. The operation is precise and efficient.

Another object of the present invention is to provide a solution where a secondary conveyance device is provided for more precisely moving a dough sheet forward after the dough sheet has been changed in moving direction. The secondary conveyance device is arranged above the material conveyance platform and comprises a frame. Mounted on the frame is an elevation device (such as a pneumatic cylinder) having an end to which a roller is mounted. After the dough sheet has changed the moving direction, the elevation device presses the roller against the dough sheet to move the dough sheet forward for the subsequent operation such (stuffing or other operations).

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
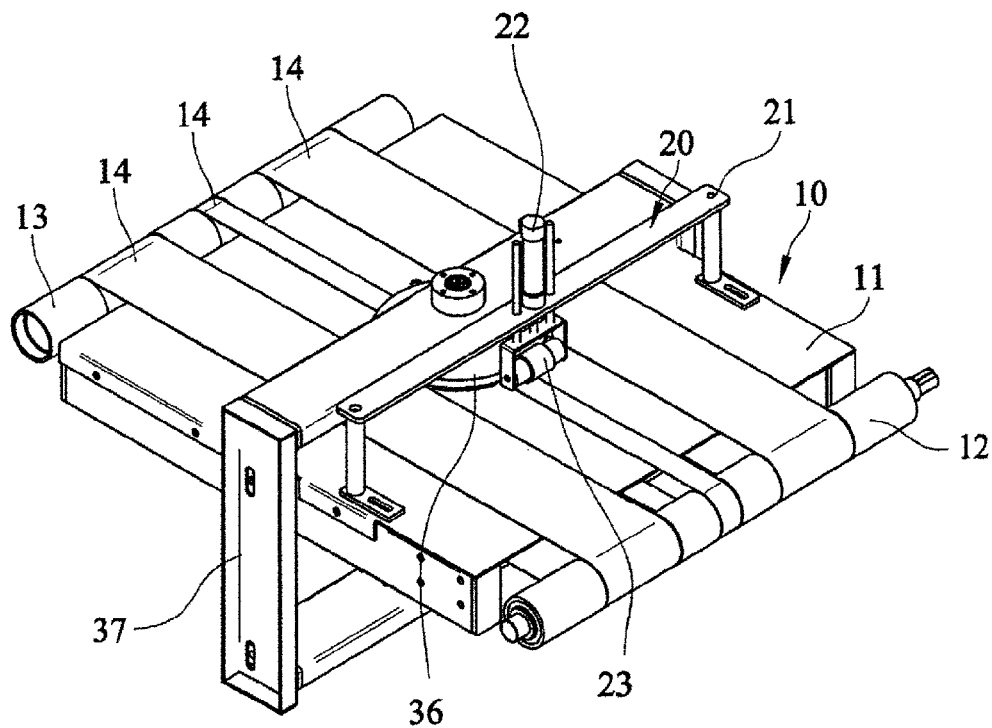
FIG. 1 is a perspective view showing the present invention.
Figure 2:
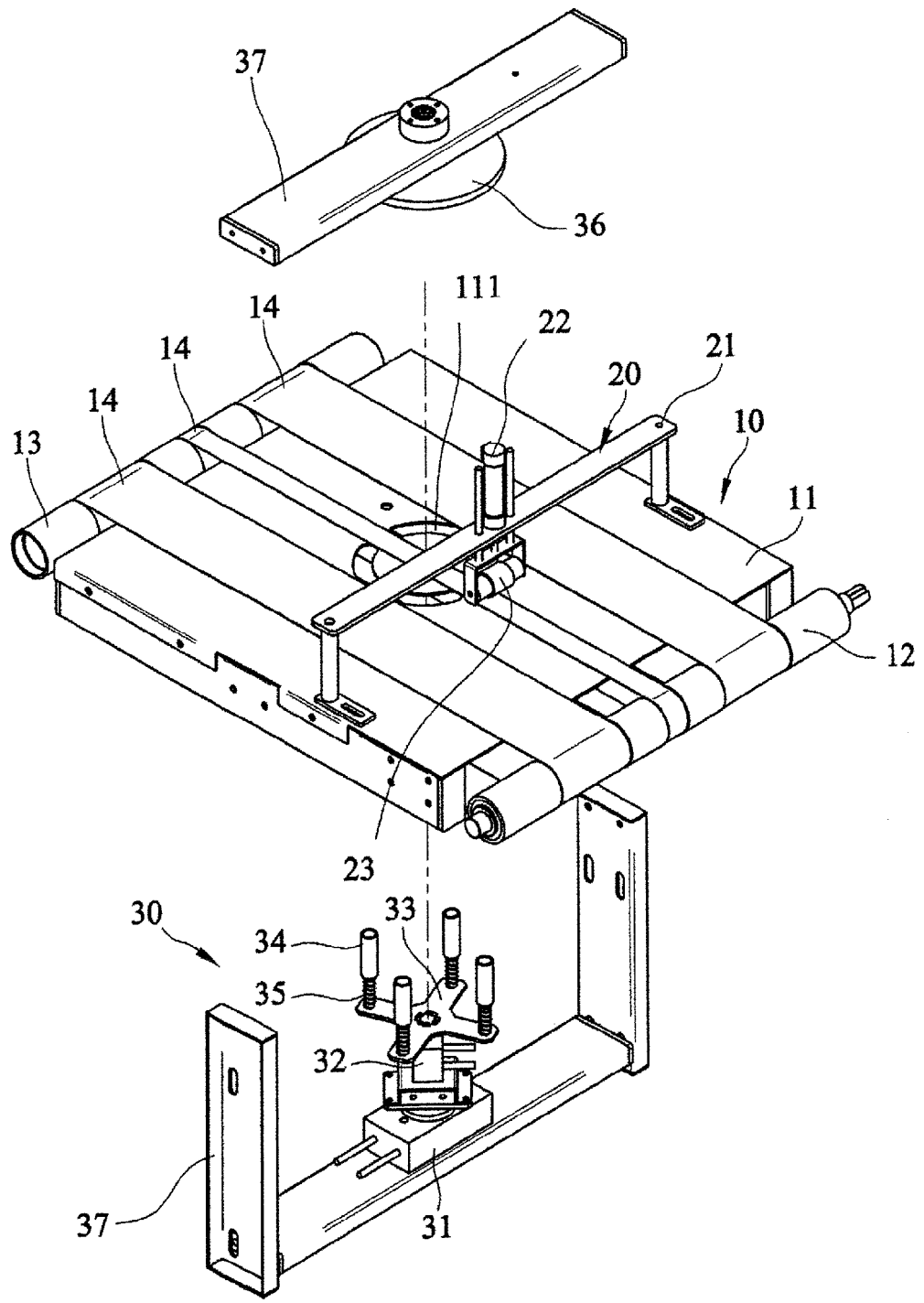
FIG. 2 is an exploded view of the present invention.

Referring to FIGS. 1 and 2, the present invention generally comprises a material conveyance platform 10. The material conveyance platform 10 comprises a table 11. The table 11 has two ends each of which is provided with a rotatable axle 12, 13 and is covered by one or more conveyance belts 14 in order to allow material to be carried on and conveyed by the conveyance belt 14. The feature of the present invention includes guide slots 111 formed in the table 11 and the guide slots 111 are not completely covered by the conveyance belt 14.

Figure 6:
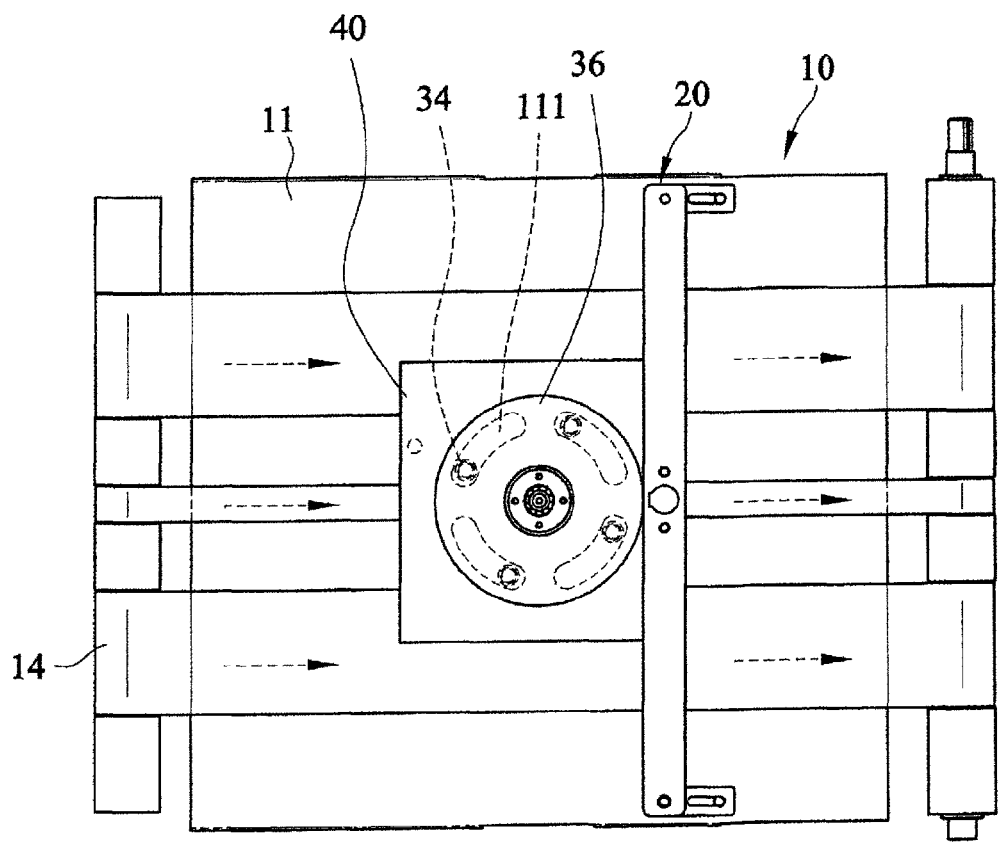
FIG. 6 is a top plan view illustrating a dough sheet is pushed upward by the push bars and held by a press plate according to the present invention.
Figure 7:
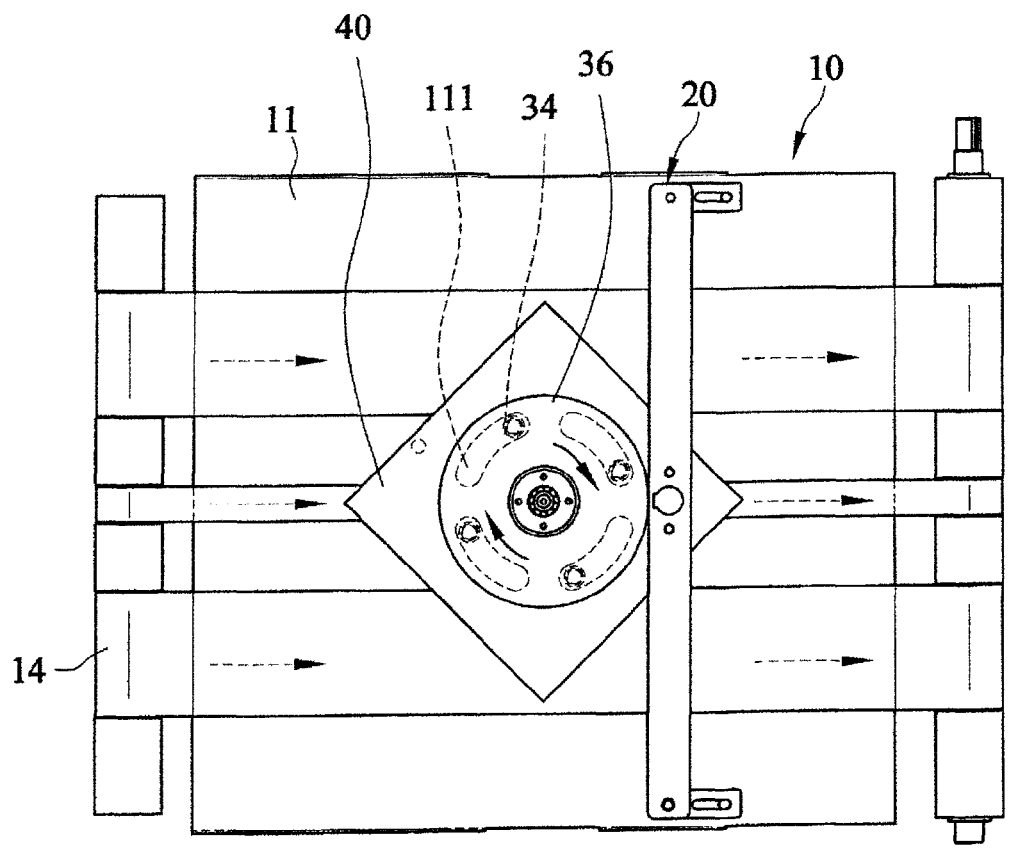
FIG. 7 is a schematic view illustrating a dough sheet is pushed upward by the push bars and held by a press plate and rotated according to the present invention.

The guide slots 111 are of an arc configuration. However, practically, the guide slots can be two opposite (semi-circular) arc slots, but are not limited thereto. Alternatively, the guide slots 111, as shown in FIGS. 6 and 7, can be four concentric arc slots. The number of the guide slots can be altered as practically needed and the present invention is not limited to any specific number of the arc slots.

Referring again to FIGS. 1 and 2, a secondary conveyance device 20 is arranged above the material conveyance platform 10 and generally comprises a frame 21 and an elevation device 22 (such as a pneumatic cylinder) mounted on the frame 21 and has a tip end to which a roller 23 is mounted.

Figure 3:
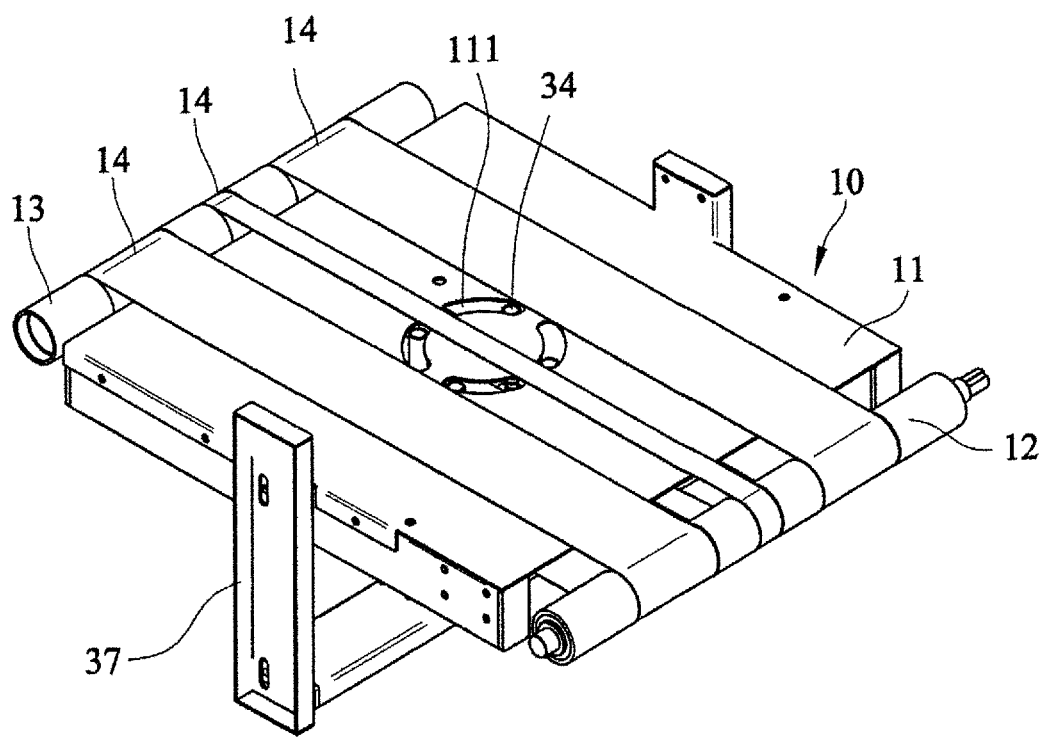
FIG. 3 is a schematic view showing push bars extending into guide slots of a table according to the present invention.

A swivel unit 30 is arranged under the material conveyance platform 10 and comprises two power sources 31, 32 (such as pneumatic cylinders or electrical motors), which are stacked on each other, wherein one power source 31 provides reciprocal rotation (for example rotation of 45 degrees), while another power source 32 provides upward extension and backward contraction. A bottom plate 33 is mounted to an end of the power sources 32 and the bottom plate 33 carries one or more push bars 34 mounted thereon. The push bars 34 (as shown in FIGS. 2 and 3) are arranged to correspond to the guide slot 111 of the table 11. To provide a cushioning effect between the push bars 34 and the bottom plate 33, a cushioning device 35 (such as a spring or an elastic plate) is arranged at an end of each push bar 34. A press plate 36 is arranged above the material conveyance platform 10 and is pivotally mounted to a support seat 37, whereby the press plate 36 is rotatable with respect to the support seat 37. The support seat 37 is fixed to the power sources 31, 32.

Figure 4:
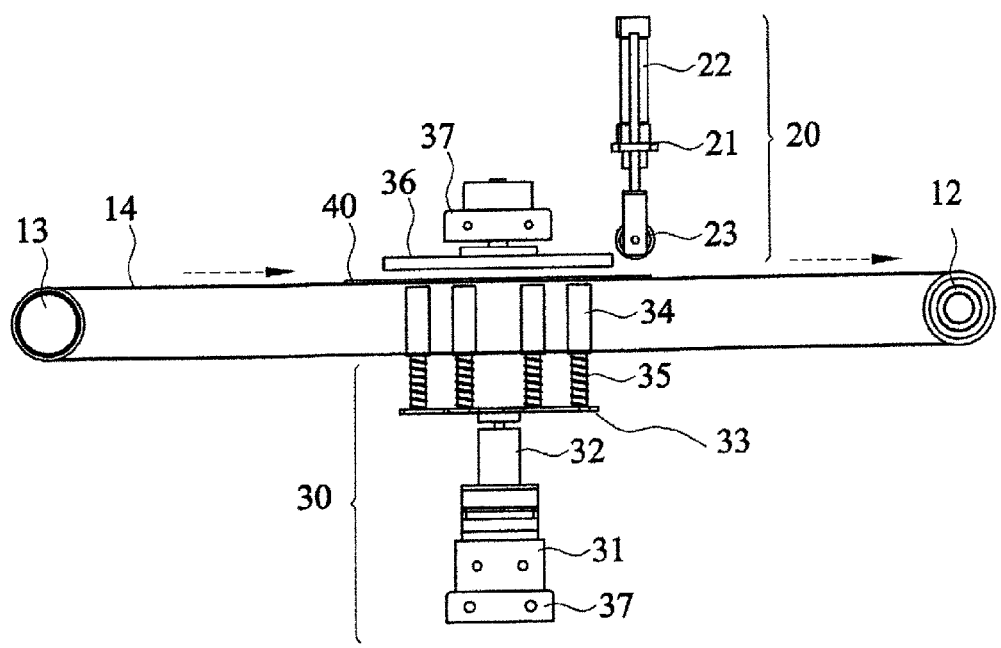
FIG. 4 is a side elevational view illustrating a dough sheet is being conveyed through the device of the present invention.
Figure 5:
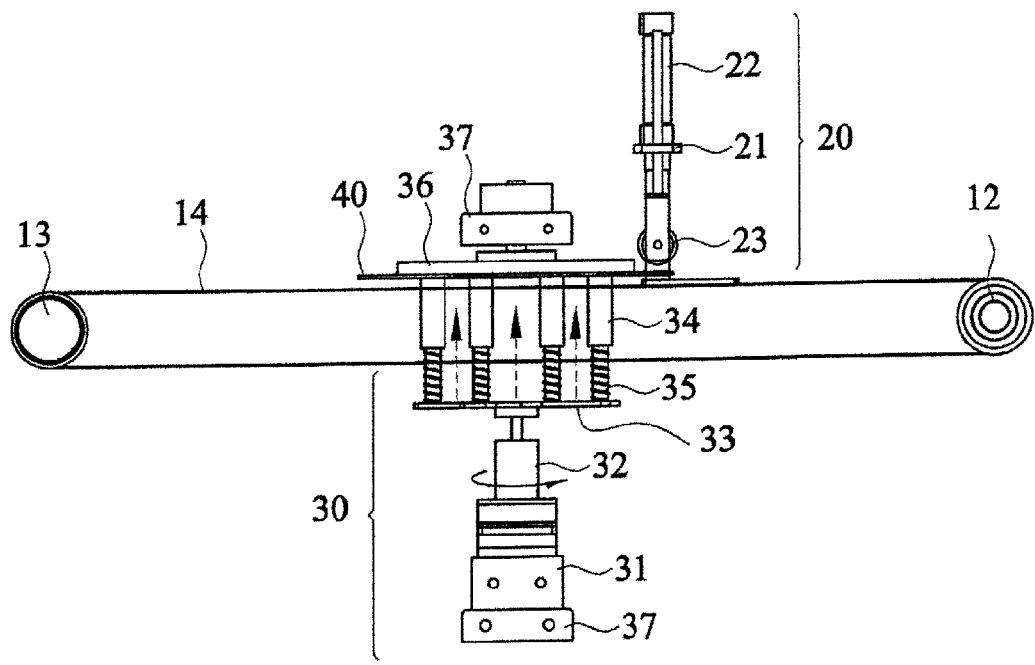
FIG. 5 is a side elevational view illustrating a dough sheet is pushed upward by the push bars and held by a press plate according to the present invention.
Figure 8:
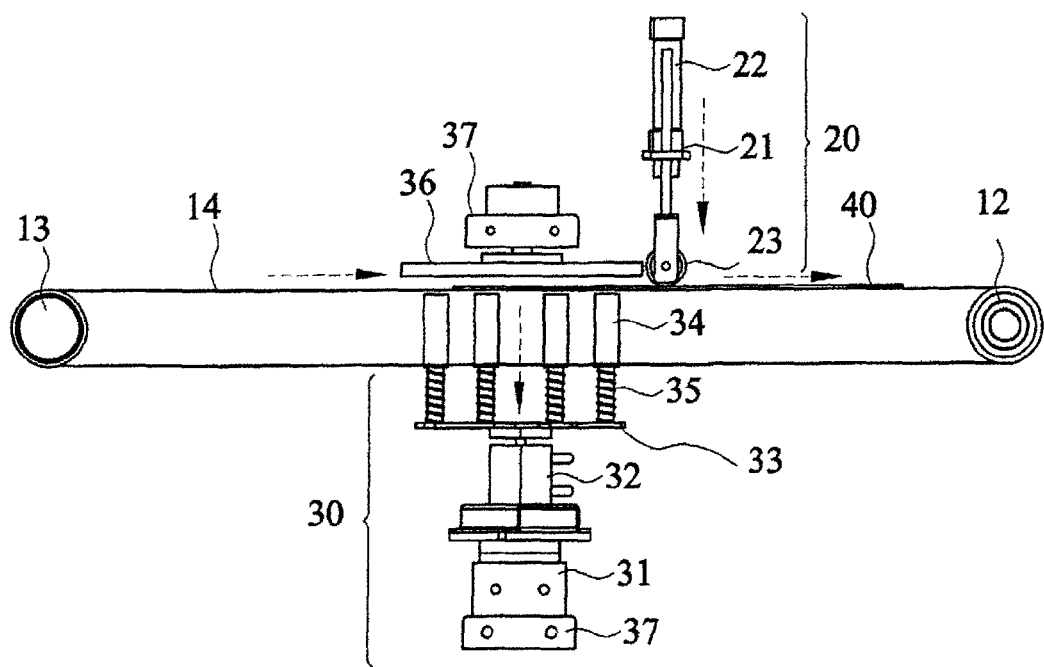
FIG. 8 is a schematic view showing a dough sheet is moved forward by a roller of a secondary conveyance device according to the present invention.
Figure 9:
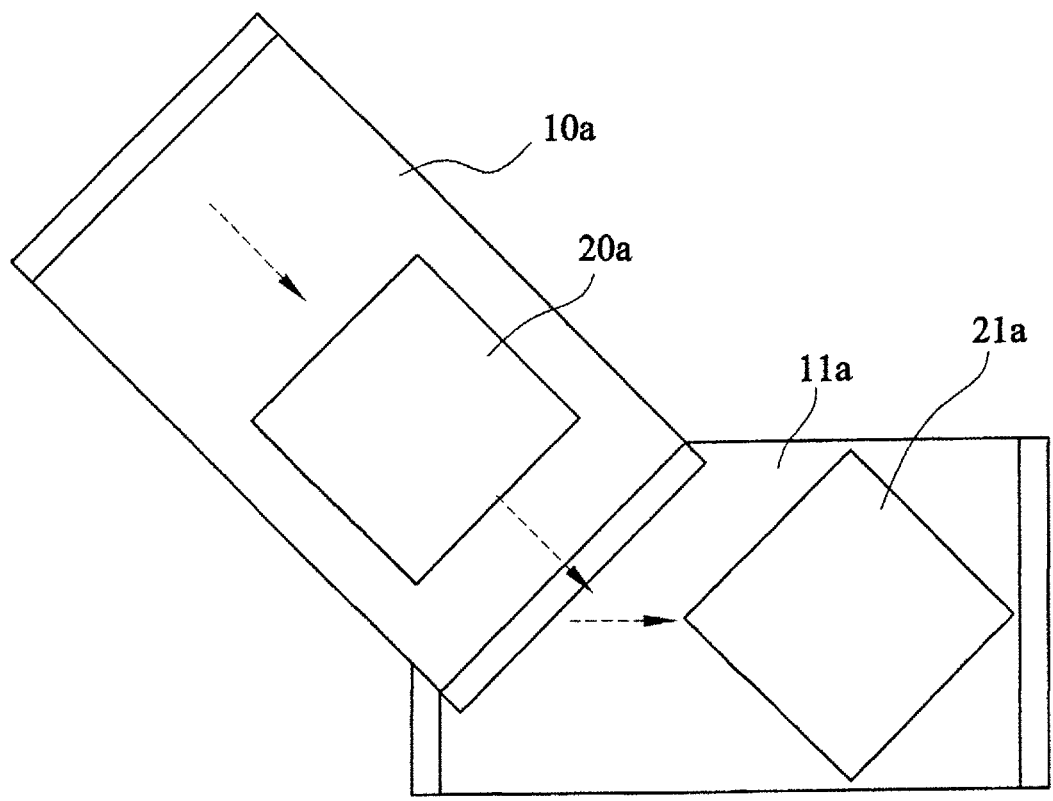
FIG. 9 is a schematic view showing a conventional way of changing direction of a dough sheet by applying two sets of conveyance belt that are arranged to intersect each other.

To practice the invention, when a dough sheet 40 is conveyed through the material conveyance platform 10 as shown in FIG. 4, the power source 32 as shown in FIGS. 2, 5, and 6 induces an upward push, by which the push bars 34 are moved upward to extend through the guide slots 111 of the table 11 thereby engaging and pushing the dough sheet 40 upward against the underside of the press plate 36. Afterward, another power source 31 rotates the bottom plate 33 and the push bars 34, as shown in FIGS. 2, 5, and 7, to cause the dough sheet 40 to rotate by a specific angle (this being observable by comparing FIGS. 6 and 7). The power source 32 is then activated to retract the bottom plate 33 and the push bars 34 backward and downward. The dough sheet 40, after being rotated by an angle, may proceed according to the speed of the material conveyance platform 10. However, for more precise operation, as shown in FIGS. 2, 7, and 8, the secondary conveyance device 20 that is located above the material conveyance platform 10 is operated to cause the elevation device 22 to press the roller 23 against the dough sheet 40 and then the dough sheet 40 is moved forward to proceed with the next operation (such as stuffing or other operations).

In the swivel unit 30 shown in FIG. 2, the power sources 31 that is used to induce rotation may provide reciprocal rotation in clockwise and counterclockwise direction so that no accumulation of error is possible so that each rotation can be done in a more precise manner.

According to the present invention, the present invention can be practiced with a limited width of a single material conveyance platform. This achieves saving of space as compared to the conventional device where each unit requires the width of two material conveyance platforms. Further, the present invention provides a swivel unit to correctly and efficiently rotate a dough sheet to a desired angle. This is more precise and more efficient as compared to the conventional way where a dough sheet needs to fall onto another conveyance platform and manual monitoring can be eliminated. The overall operation can be done more smoothly. Conclusively, the present invention provides a significant improvement over the conventional devices.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A direction change device for conveyance of dough, comprising at least:
    a material conveyance platform, which comprises a table that has opposite ends each of which is provided with a rotatable axle and is covered by one or more conveyance belts, the improvement including that at least one guide slot formed in the table and is not covered by the one or more conveyance belts; and
    a swivel unit, which is arranged under the material conveyance platform and comprises two power sources that are stacked on each other, one of power sources providing reciprocal rotation, another one of the power sources providing upward extension and backward contraction, said another one of the power sources having an end to which a bottom plate is mounted, the bottom plate carrying a push bar mounted thereon to correspond to each of the at least one guide slot of the table; a press plate being arranged above the material conveyance platform and pivotally mounted to a support seat.

2. The direction change device for conveyance of dough according to claim 1, wherein the guide slot of the table is of an arc shape.

3. The direction change device for conveyance of dough according to claim 2, wherein the table comprises at least two arc guide slots that are arranged opposite to each other.

4. The direction change device for conveyance of dough according to claim 1, wherein a secondary conveyance device is arranged above the material conveyance platform, the secondary conveyance device comprising at least an elevation device that has an end to which a roller is mounted.

5. The direction change device for conveyance of dough according to claim 1, wherein the power sources of the swivel unit are selectively pneumatic cylinders or electrical motors.

6. The direction change device for conveyance of dough according to claim 1, wherein the push bar of the swivel unit comprises a cushioning device arranged at an end thereof.

* * * * *